US012338679B2

(12) United States Patent
Kindt et al.

(10) Patent No.: US 12,338,679 B2
(45) Date of Patent: Jun. 24, 2025

(54) WEATHERSTRIP CARRIER THAT REMOVABLY ATTACHES TO FENESTRATION UNIT

(71) Applicant: JELD-WEN, Inc., Charlotte, NC (US)

(72) Inventors: Derek Lee Kindt, Klamath Falls, OR (US); Craig E. Abbott, Klamath Falls, OR (US)

(73) Assignee: JELD-WEN, Inc.

( * ) Notice: Subject to any disclaimer, the term of this patent is extended or adjusted under 35 U.S.C. 154(b) by 294 days.

(21) Appl. No.: 17/443,347

(22) Filed: Jul. 26, 2021

(65) Prior Publication Data

US 2023/0027784 A1 Jan. 26, 2023

(51) Int. Cl.
*E06B 7/23* (2006.01)
*E06B 1/70* (2006.01)

(52) U.S. Cl.
CPC ............ *E06B 7/231* (2013.01); *E06B 7/2316* (2013.01); *E06B 1/70* (2013.01)

(58) Field of Classification Search
CPC .... E06B 3/4609; E06B 3/4636; E06B 7/2316; E06B 1/70; E06B 2001/707; E06B 1/702; E06B 7/231
USPC ..................................... 49/490.1, 492.1, 377
See application file for complete search history.

(56) References Cited

U.S. PATENT DOCUMENTS 4,028,849 A * 6/1977 Anderson ............. E06B 1/6053 49/446
4,318,249 A * 3/1982 Landreth ............... E06B 7/2312 49/490.1
4,323,277 A * 4/1982 Rengstl .................... B60J 10/82 49/490.1

(Continued)

FOREIGN PATENT DOCUMENTS

DE 102018007189 A1 * 8/2019 ........... E05D 15/565

OTHER PUBLICATIONS jeld-wen.com. Jeld-Wen Windows & Doors. Premium(TM) Vinyl Windows and Patio Doors. [Retrieved Jul. 23, 2021]. Retrieved from Internet: <URL: https://cmd-jeld-wen.s3.us-east-2.amazonaws.com/assets/documents/4066250970.pdf>.

*Primary Examiner* — Daniel P Cahn
*Assistant Examiner* — Patrick B. Ponciano
(74) *Attorney, Agent, or Firm* — Lorenz & Kopf LLP

(57) ABSTRACT

A weatherstrip carrier of a replaceable weatherstrip system for a fenestration unit includes a weatherstrip support configured to hold a weatherstrip. The weatherstrip carrier also includes a coupling member that is attached to the weatherstrip support. The coupling member is configured to removably attach to the fenestration unit. The coupling member includes a spine, a first projection, and a second projection. The first and second projections project from the spine in a common direction. The coupling member is resiliently flexible for movement between a neutral position and a flexed position. The first and second projections are (Continued)

biased toward each other when the weatherstrip carrier is in the flexed position. The second projection is configured to be removably received within the fenestration unit, with the weatherstrip carrier in the flexed position, and with the first and second projections cooperatively compressing against the fenestration unit to retain the weatherstrip carrier thereon.

18 Claims, 3 Drawing Sheets

(56) References Cited

U.S. PATENT DOCUMENTS

| | | | | | |
|---|---|---|---|---|---|
| 5,067,279 | A * | 11/1991 | Hagemeyer | E06B 7/2316 | 49/470 |
| 5,611,173 | A * | 3/1997 | Headrick | E06B 1/70 | 49/467 |
| 5,840,401 | A * | 11/1998 | Baesecke | B60J 10/16 | 49/490.1 |
| 6,789,359 | B2 * | 9/2004 | Bauman | E06B 7/14 | 49/471 |
| 7,219,899 | B2 * | 5/2007 | Kesseg | B60J 10/80 | 277/921 |
| 8,230,646 | B2 * | 7/2012 | McDaniel | E06B 1/70 | 49/467 |
| 8,490,332 | B2 * | 7/2013 | Van Camp | E06B 1/70 | 49/468 |
| 8,701,351 | B2 * | 4/2014 | Siegel | B60P 3/34 | 277/921 |
| 8,991,100 | B2 * | 3/2015 | Van Camp | E06B 7/18 | 49/303 |
| 9,540,861 | B2 * | 1/2017 | Abdul Lathief | E06B 3/5821 | |
| 9,562,387 | B2 * | 2/2017 | Meeks | E06B 1/70 | |
| 9,784,029 | B2 * | 10/2017 | Grondin | E06B 7/2314 | |
| 10,822,862 | B2 * | 11/2020 | Header | E06B 3/26303 | |
| 11,365,582 | B1 * | 6/2022 | Salvoni | E05D 15/08 | |
| 11,542,746 | B2 * | 1/2023 | Header | E06B 7/2309 | |
| 2005/0193635 | A1 * | 9/2005 | Hemauer | B60J 10/18 | 49/490.1 |
| 2010/0162644 | A1 * | 7/2010 | Campbell | E06B 7/14 | 52/656.2 |
| 2016/0230447 | A1 * | 8/2016 | Grondin | E06B 7/2305 | |
| 2018/0119483 | A1 * | 5/2018 | Kendall | E06B 7/22 | |
| 2020/0370365 | A1 * | 11/2020 | Nana | E06B 1/70 | |
| 2022/0243523 | A1 * | 8/2022 | Kendall | E06B 1/70 | |
| 2023/0053862 | A1 * | 2/2023 | Mak | E06B 7/2307 | |

* cited by examiner

WEATHERSTRIP CARRIER THAT REMOVABLY ATTACHES TO FENESTRATION UNIT

TECHNICAL FIELD

The present disclosure generally relates to a fenestration unit and, more particularly, relates to a weatherstrip carrier that removably attaches to a fenestration unit.

BACKGROUND

Fenestration units, such as sliding doors and windows, may include features for managing rainwater, snow runoff, sleet, water from nearby sprinkler systems, and/or other water. These features may help divert water and/or channel water away from the interior of the structure.

However, several challenges remain in this regard. For example, some of these features may fail when subjected to extreme conditions and allow for undesirable water intrusion. Also, for fenestration units with an active or movable panel (e.g., a sliding door or window), these water diversion features may disadvantageously increase the operating force that is necessary for moving the panel. Furthermore, these features may present manufacturing difficulties, for example, by increasing part count, by increasing assembly time, by decreasing manufacturability, etc.

Thus, it is desirable to provide improved water management features for a fenestration unit, including features that provide more robust water diversion and other weather resistance. It is also desirable to incorporate such features without significantly increasing necessary operating forces for moving panels of the fenestration unit. Furthermore, it is desirable to provide weather management features that provide increased manufacturing efficiencies. Other desirable features and characteristics of the present disclosure will become apparent from the subsequent detailed description and the appended claims, taken in conjunction with the accompanying drawings and this background discussion.

BRIEF SUMMARY

In one embodiment, a weatherstrip carrier for a fenestration unit is disclosed. The weatherstrip carrier includes a weatherstrip support configured to hold a weatherstrip. The weatherstrip carrier also includes a coupling member that is attached to the weatherstrip support. The coupling member is configured to removably attach to the fenestration unit. The coupling member includes a spine, a first projection, and a second projection. The first and second projections project from the spine in a common direction. The coupling member is resiliently flexible for movement between a neutral position and a flexed position. The first and second projections are biased toward each other when the weatherstrip carrier is in the flexed position. The second projection is configured to be removably received within the fenestration unit, with the weatherstrip carrier in the flexed position, and with the first and second projections cooperatively compressing against the fenestration unit to retain the weatherstrip carrier thereon.

In another embodiment, a method of manufacturing a weatherstrip carrier for a fenestration unit is disclosed. The method includes forming a weatherstrip support of the weatherstrip carrier. The weatherstrip support is configured to hold a weatherstrip. Moreover, the method includes forming a coupling member that is attached to the weatherstrip support. The coupling member is configured to removably attach to the fenestration unit. Forming the coupling member includes forming the coupling member to include a spine, a first projection, and a second projection. The first and second projections project from the spine in a common direction. The coupling member is resiliently flexible for movement between a neutral position and a flexed position. The first and second projections are biased toward each other when the weatherstrip carrier is in the flexed position. The second projection is configured to be removably received within the fenestration unit, with the weatherstrip carrier in the flexed position, and with the first and second projections cooperatively compressing against the fenestration unit to retain the weatherstrip carrier thereon.

In an additional embodiment, a fenestration unit is disclosed. The fenestration unit includes a frame and a panel that is supported by the frame. The fenestration unit also includes a weatherstrip system that is removably attached to the frame. The weatherstrip system includes a weatherstrip carrier and a weatherstrip. The weatherstrip carrier is configured to retain the weatherstrip against the panel. The weatherstrip carrier includes a spine, a first projection, and a second projection. The first and second projections project from the spine in a common direction. The weatherstrip carrier is resiliently flexible for movement between a neutral position and a flexed position. The first and second projections are biased toward each other when the weatherstrip carrier is in the flexed position. Also, the second projection is removably received within the frame, with the weatherstrip carrier in the flexed position, and with the first and second projections cooperatively compressing against the frame to retain the weatherstrip carrier thereon.

BRIEF DESCRIPTION OF THE DRAWINGS

The Present Disclosure Will Hereinafter be Described in Conjunction with the Following Drawing Figures, Wherein Like Numerals Denote Like Elements, and Wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a weatherstrip carrier of a weatherstrip system for a fenestration unit, such as a window, door, sliding door, etc. The weatherstrip carrier may support, hold, and retain a weatherstrip against a passive or active panel of a sliding door or horizontally-sliding window in some embodiments. The weatherstrip carrier may also removably attach to the frame of the fenestration unit with an attached weatherstrip substantially sealed against the panel to thereby divert water away therefrom. The weatherstrip may be removably attached to the carrier in some embodiments so as to be replaceable. In some embodiments, the weatherstrip carrier may removably clip, clamp, or otherwise compress against a frame of the fenestration unit. The weatherstrip carrier may resiliently and elastically deform from a neutral position to a flexed position. First and second members of the weatherstrip carrier may be resiliently biased toward each other to cooperatively compress against the frame, thereby retaining the carrier on the frame with the weatherstrip substantially sealed against the panel of the fenestration unit.

Furthermore, the weatherstrip carrier may include a first compression member and a second compression member (i.e., a first jaw-like projection and a second jaw-like projection) that are attached by a spine of the weatherstrip carrier. The second compression member may be received in an aperture of the fenestration unit frame, the spine may overlap and cover an exterior surface of the frame, and the second compression member may cooperate with the first compression member to grip onto and clip to the frame. The weatherstrip carrier may be resiliently flexed when removably attached to the frame such that the compression members are biased together and such that the compression members cooperatively clip to the frame of the fenestration unit. In this position, the weatherstrip may be supported on and sealed against the panel of the fenestration unit and angled away therefrom to divert water.

The weatherstrip carrier may include these and/or other features that provide highly robust weather resistance. These features may be incorporated without significantly increasing necessary operating forces for moving the panels of the fenestration unit. Furthermore, one or more features of the present disclosure may provide manufacturing benefits, such as lower part count, increased manufacturing efficiency, and/or other advantages.

Figure 1:
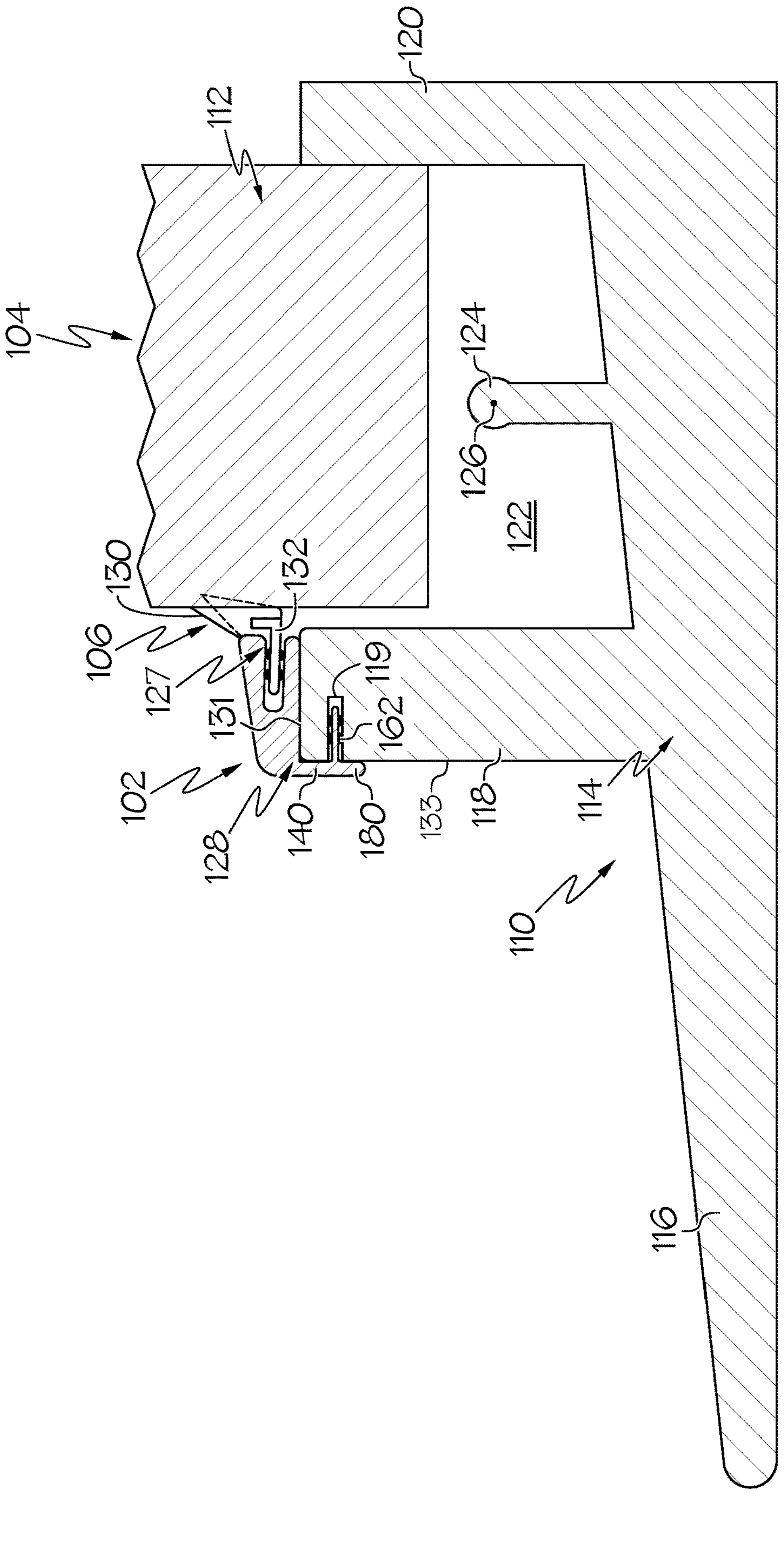
FIG. 1 is a section view of a fenestration unit and a weatherstrip system attached thereto according to example embodiments of the present disclosure.

Referring initially to FIG. 1, a weatherstrip carrier 102 of a fenestration unit 104 is illustrated according to example embodiments of the present disclosure. The weatherstrip carrier 102 may be removably attached to the fenestration unit 104 and may hold a weatherstrip 106 against the fenestration unit 104 as will be discussed in greater detail below.

In some embodiments, the fenestration unit 104 may be a sliding door, and the majority of the discussion will refer to the fenestration unit 104 as such as an example. However, it will be appreciated that the weatherstrip carrier 102 may be configured for a horizontally-sliding window, a swinging door or window, or another type of fenestration unit 104 without departing from the scope of the present disclosure.

As shown in FIG. 1, the fenestration unit 104 may include a frame 110 that supports a panel 112. The panel 112 may be a passive or active panel of a sliding door. Although the panel 112 is schematically illustrated, it will be appreciated that the panel 112 may include a number of components, such as a bottom rail that supports a glass or other glazing unit and/or other components. The frame 110 may include a sill 114. The sill 114 may include a base 116 and an exterior upstand 118 that projects upward from the base 116 in a vertical direction (opposite the direction of gravity). The sill 114 may also include an interior upstand 120 that also projects from the base 116 in the upward, vertical direction. The interior upstand 120 may be spaced from the exterior upstand 118 in a lateral direction. As such, a gap 122 may be defined between the exterior upstand 118 and the interior upstand 120, and the base 116 may substantially close off the bottom side of the gap 122. The frame 110 may further include a rail 124 that projects upward vertically from the base 116.

The sill 114 may be elongate and may extend in a longitudinal direction along a longitudinal axis 126. The cross-sectional profile of the side 114 may remain substantially constant along the axis 126. The rail 124 may support sliding movement of the panel 112 of the fenestration unit 104. More specifically, in embodiments in which the panel 112 is an active panel of a sliding door fenestration unit 104, the rail 124 may support sliding movement of the panel 112 along the axis 126 (e.g., using one or more roller elements, roller element bearings, etc.).

Figure 2:
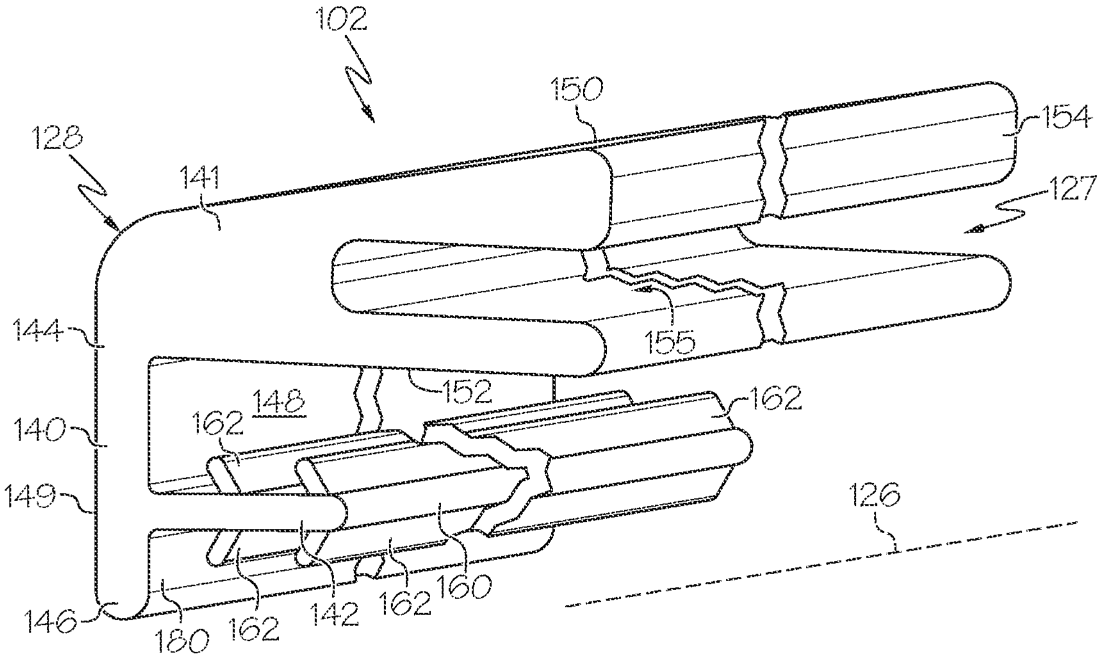
FIG. 2 is an isometric view of a weatherstrip carrier of the weatherstrip system of FIG. 1.
Figure 3:
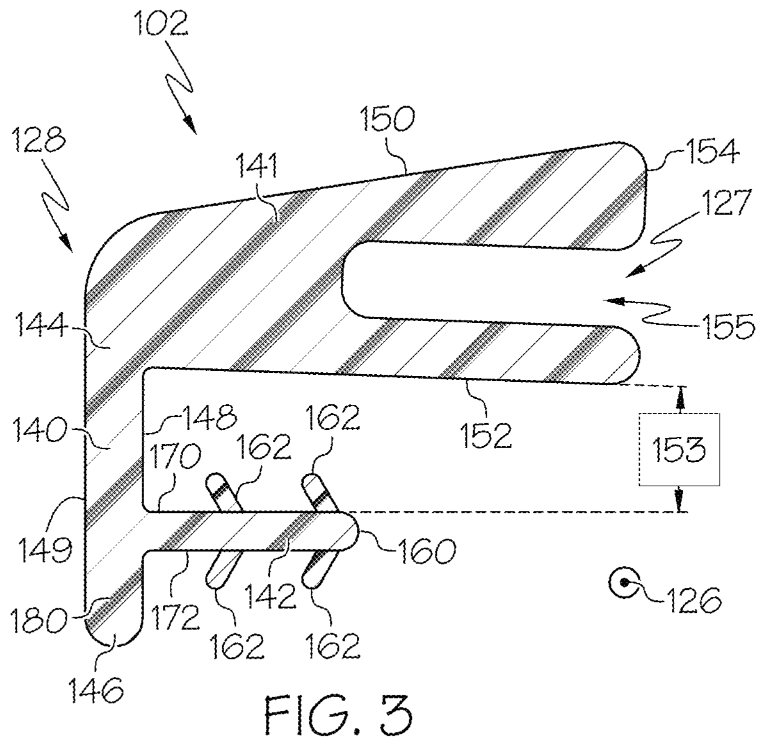
FIG. 3 is a section view of the weatherstrip carrier of FIG. 2.

As shown in FIGS. 1-3, the weatherstrip carrier 102 may be an elongate, rail-shaped member that extends substantially parallel to the longitudinal axis 126. The weatherstrip carrier 102 may have a generally F-shaped cross section in some embodiments (FIGS. 1 and 3). The weatherstrip carrier 102 may generally include a weatherstrip support 127 and a coupling member 128. The weatherstrip support 127 and the coupling member 128 of the weatherstrip carrier 102 are shown in isolation in FIGS. 2 and 3 for clarity. As shown, the carrier 102 may be a monolithic, unitary part in which the coupling member 128 and the weatherstrip support 127 are integrally attached. For example, the carrier 102 may be formed via an extrusion process in some embodiments for efficient manufacture such that the carrier 102 is unitary and monolithic.

The weatherstrip carrier 102 may generally include a spine 140 as shown in FIGS. 2 and 3. The spine 140 may be a flat, generally planar strip that is elongate and that extends along the axis 126. The spine 140 may have a first portion 144 and a second portion that defines an edge 146. The spine 140 may be arranged such that the first portion 144 and the edge 146 are spaced apart in the vertical direction. The spine 140 may also have an inner surface 148 and an outer surface 149 with a thickness dimension measured therebetween. The width of the spine 140 may be significantly greater than the thickness of the spine 140, and the longitudinal length of the spine 140 measured along the axis 126 may be significantly greater than both the width and thickness dimensions of the spine 140.

The weatherstrip carrier 102 may further include a first projection 141. The first projection 141 may be wedge-shaped in cross section (FIG. 3) and may be elongate (FIG. 2) so as to extend along the axis 126. The first projection 141 may be fixedly attached to the spine 140 and may project laterally from the first portion 144 of the spine 140. The first projection 141 may have a lower inner surface 152 (i.e., an underside surface). The lower inner surface 152 may be substantially flat and planar. The first projection 141 may additionally include an upper exterior surface 150 that faces generally upward and opposite the lower inner surface 152. The upper exterior surface 150 may be relatively flat and may be sloped relative to the vertical direction so as to define the wedge-shape of the first projection 141. The first projection 141 may additionally include a leading end 154 that is disposed on the projected end of the first projection 141 (on the lateral side opposite the spine 140).

The leading end 154 may include an aperture, such as an elongate groove 155, a depth-direction of the groove 155 being directed laterally into the first projection 141. The groove 155 may receive the weatherstrip 106 in some embodiments, for example, for removably receiving the weatherstrip 106. Accordingly, the leading end 154 of the first projection 141 and the groove 155 therein may define the weatherstrip support 127 of the weatherstrip carrier 102.

The weatherstrip carrier 102 may additionally include a second projection 142. The second projection 142 may be a barbed or finned strip that projects laterally from the spine 140. The second projection 142 may project from the spine 140 from an area that is spaced away from the edge 146 of the spine 140 so as to define a flange 180 between the edge 146 and the second projection 142.

In some embodiments, the second projection 142 may include a base strip 160 that projects from the spine 140 laterally in the same direction as the first projection 141. The base strip 160 may include an upper surface 170 that faces toward the lower inner surface 152 of the first projection 141, and a lower surface 172 that faces in the opposite direction. The second projection 142 may also include a plurality (e.g., four) barbs 162. The barbs 162 may be elongate and relatively flat, planar strips that project from the base strip 160 at an angle (e.g., at an approximately forty-five-degree (45°) angle) relative to the lateral direction. At least one of the barbs 162 may be angled away from the upper surface 170 and back toward the spine 140, and at least one of the bars 162 may be angled away from the lower surface 172 and back toward the spine 140. The barbs 162 may be resiliently flexible for flexure relative to the base strip 160.

In some embodiments, the spine 140, the first projection 141, and the base strip 160 of the second projection 142 may be made of a first material, such as a first polymeric material, whereas the barbs 162 may be made of a second material, such as a second polymeric material. In some embodiments, the spine 140, the first projection 141, and the base strip 160 may be constructed from chlorinated polyvinyl chloride (CPVC) material, whereas the barbs 162 may me be constructed from a thermoplastic elastomer material of a higher flexibility. Thus, the material of the barbs 162 may have higher flexibility than the other portion of the carrier 102. These different portions constructed from different materials may be integrally connected, for example, via a co-extrusion process such that the weatherstrip carrier 102 may be unitary and monolithic.

The carrier 102 may exhibit a degree of flexibility so as to move from a neutral position (shown in FIGS. 2 and 3) to a flexed position represented in FIG. 1. The carrier 102 may have enough resiliency to allow the first projection 141 and the second projection 142 to rotate and flex away from each other. In some embodiments, the vertical extension of the spine 140 may provide a type of living hinge for this resilient flexure. When flexed, the first and second projections 141, 142 may be biased back toward each other (i.e., toward the neutral position). This biasing force may be utilized to attach the carrier 102 to the frame 110 as will be discussed.

As shown in FIG. 3, the lower inner surface 152 and the upper surface 170 may be substantially planar and disposed at a non-zero angle 153 relative to each other when the carrier 102 is in the neutral position. The first and second projections 141, 142 may be pivotally supported by the spine 140. To flex the carrier 102, the first projection 141 may resiliently deflect upward and rotate slightly away such that the angle 153 moves closer to zero (i.e., such that the surfaces 152, 170 move toward a parallel arrangement. The carrier 102 may recover resiliently to restore the non-zero angle 153.

Moreover, as shown in FIG. 1, the weatherstrip carrier 102 may support a weatherstrip 106. The weatherstrip 106 may include a flexible, elongate strip 130 of rubber or other polymeric material. The strip 130 may have a blade-shaped profile on one edge, and the opposite edge may be fixedly attached to a mounting member 132 of the weatherstrip 106. The mounting member 132 may be a relatively stiff and rigid post or rail on which the strip 130 is fixed. In some embodiments, the mounting member 132 may be removably attached to the weatherstrip support 127 of the carrier 102. For example, the mounting member 132 may be removably received within the groove 155 of the carrier 102. Accordingly, the weatherstrip 106 may inserted, removed, and replaced manually for convenience. However, the strip 130 may be attached in other ways without departing from the scope of the present disclosure. For example the strip 130 may be attached and fixed in a more permanent manner (i.e., may be non-removable) in some embodiments of the present disclosure.

With the weatherstrip 106 attached to the carrier 102, the coupling member 128 of the carrier 102 may be removably mounted on the frame 110 of the fenestration unit 104. More specifically, the second projection 142 may be inserted and received within an aperture 119 of the upstand 118 of the frame 110. The aperture 119 may be an elongate kerf that extends laterally into the upstand 118 and that extend longitudinally along the axis 126. The second projection 142 may be inserted manually, the barbs 162 may resiliently bend during insertion, and the barbs 162 may thereafter bias against the internal surface of the aperture 119 to remain frictionally engaged to the frame 110.

Furthermore, as the carrier 102 is advanced onto the frame 110 in the lateral direction, the surface 152 of the first projection 141 may slide over a horizontal upper lip surface 131 of the upstand 118. This may resiliently deflect the carrier 102 and slightly pivot the first projection 141 away from the second projection 142 to change the angle 153 and seat the first projection 141 onto the upper lip surface 131. The carrier 102 may continue to advance onto the frame 110 until the strip 130 abuts and resiliently flexes against the panel 112. The strip 130 is shown in solid lines in FIG. 1 in an exemplary sealed position against the panel 112. (A neutral, unflexed position of the strip 130 is shown in broken lines for comparison.) Furthermore, the carrier 102 may be advanced onto the frame 102 such that the spine 140 is layered over and covers part of an exterior-facing vertical surface 133 of the upstand 118. The flange 180 of the spine 140 may abut against the frame 110 and may provide additional support for the carrier 102 as well.

When attached to the upstand 118 in the position shown in FIG. 1, the carrier 102 may remain in its flexed position such that the first projection 141 is biased toward the second projection 142. Accordingly, the first projection 141 and the second projection 142 may cooperatively compress against and grip the frame 110 to retain the carrier 102 thereon. Thus, the first projection 141 may be referred to as a first compression member or first jaw of the carrier 102, and the second projection 142 may be referred to as a second compression member or second jaw of the carrier 102. It will be appreciated that the clamping action of the carrier 102 and its resilient flexibility facilitates installation and removal of the carrier 102. Furthermore, these features allow the carrier 102 to be manufactured efficiently (e.g., via an extrusion process).

The carrier 102 also retains the weatherstrip 106 for effectively diverting water runoff, etc. from the panel 112 and away from the gap 122 within the frame 110. Also, the sloped upper exterior surface 150 may be sloped away from the panel 112 and sloped relative to the direction of gravity to further divert water runoff, etc. away from the panel 112 and the gap 122 within the frame 110.

Figure 4:
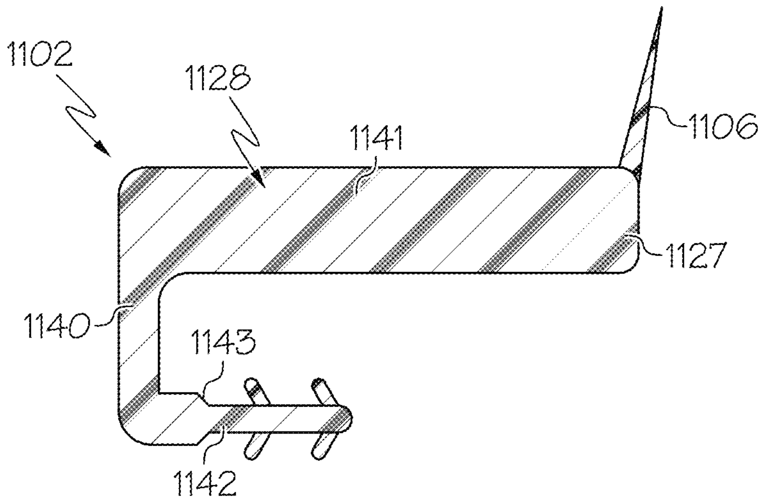
FIG. 4 is a section view of the weatherstrip system according to additional example embodiments of the present disclosure.

Referring now to FIG. 4, additional embodiments of the carrier 1102 are illustrated. The carrier 1102 may be similar to the embodiments discussed above except as noted. Features that correspond to those of FIGS. 1-3 are indicated with corresponding reference numbers increased by 1000.

The coupling member 1128 of the carrier 1102 may include the spine 1140, the first projection 1141, and the second projection 1142. The coupling member 1128 may be configured to resiliently bias for compressing against a fenestration frame, similar to the embodiment of FIG. 1. However, the second projection 1142 may be shaped with a taper 1143, and the second projection 1142 may project from the lower (second) edge of the spine 1140. Furthermore, the weatherstrip 1106 may be fixedly and non-removably attached (e.g., molded) to the first projection 1141.

Like the embodiments of FIGS. 1-3, the carrier 1102 and its weatherstrip 1106 may be conveniently and robustly attached to a fenestration frame for diverting water runoff, etc. away therefrom. Furthermore, the coupling member 1128 may provide the various manufacturing efficiencies discussed above.

Moreover, the weatherstrip systems of FIGS. 1-4 may provide water diversion features without significantly increasing the operating forces necessary for opening the panel 112 of the fenestration unit. The weatherstrip 106, 1106 may be biased toward the neutral position and may bias and move from the flexed position toward the neutral position, for example, when the panel 112 is part of a sliding door and the panel 112 moves along the axis 126 and out of abutting contact with the strip 130. Furthermore, the panel 112 may move in the opposite direction and slide along the axis 126, and the weatherstrip 106, 1106 may resiliently flex from the neutral position to the flexed position to seal thereon.

In additional embodiments of the present disclosure, the second projection 142, 1142 may vary from the illustrated embodiment. Instead of being integrally attached to the spine 140, 1140, the second projection 142, 1142 may be removably attached to the spine 140, 1140. For example, the second projection 142, 1142 may be a screw or other fastener that extends through the spine 140, 1140 to fasten to the panel 112. In addition, the first projection 141, 1141 may flex resiliently to compress against the panel 112, similar to the embodiments discussed above. Furthermore, it will be appreciated that the spine 140, 1140 or other portions may be adhesively attached (e.g., via double-sided tape), or otherwise attached to the panel 112 without departing from the scope of the present disclosure.

Further, also the following examples are provided:

In an example, a weatherstrip carrier for a fenestration unit is provided that comprises a weatherstrip support configured to hold a weatherstrip and a coupling member that is attached to the weatherstrip support. The coupling member is configured to removably attach to the fenestration unit. The coupling member includes a spine, a first projection, and a second projection. The first and second projections are projecting from the spine in a common direction. The coupling member is resiliently flexible for movement between a neutral position and a flexed position. The first and second projections are biased toward each other when the weatherstrip carrier is in the flexed position. Further, the second projection is configured to be removably received within the fenestration unit, with the weatherstrip carrier in the flexed position, and with the first and second projections cooperatively compressing against the fenestration unit to retain the weatherstrip carrier thereon.

In an option, the first and second projections are pivotally supported for varying an angle defined therebetween as the coupling member resiliently flexes between the neutral position and the flexed position.

In an additional option, the first projection includes a substantially planar underside surface, and the second projection includes an opposing surface that opposes the underside surface. Further, the angle is defined between the underside surface and the opposing surface.

In an additional or alternative option, the first projection includes an exterior surface that is sloped. The exterior surface is also configured to be sloped relative to a direction of gravity when removably attached to the fenestration unit for weather runoff therefrom.

In a still further additional or alternative option, the second projection includes at least one barb that is resiliently flexible and that is configured to frictionally engage an interior surface of the fenestration unit.

In another additional or alternative option, the weatherstrip support is configured to removably attach to the weatherstrip.

As an option of the weatherstrip carrier, provided additionally or alternatively, the weatherstrip support includes an aperture that is configured to receive the weatherstrip.

As another additional or alternative option, the second projection includes a groove that is configured to removably receive the weatherstrip.

As a further additional or alternative option, the weatherstrip carrier is monolithic.

As another additional or alternative option, the weatherstrip carrier includes a first portion and a second portion that are integrally connected. The second portion is having a higher flexibility than the first portion, and the second portion is of a different material from the first portion.

As a further additional or alternative option, the spine includes a first edge and a second edge. The first projection extends from the first edge; the second projection is spaced from the second edge; and the spine includes a flange defined between the second projection and the second edge.

As an additional or alternative option, when the second projection is received in the fenestration unit, the spine is configured to at least partly cover an outward-facing surface of a frame of the fenestration unit, and the first projection is configured to at least partly cover a substantially horizontal lip surface of the frame with the weatherstrip substantially sealed against a panel of the fenestration unit.

As another option, provided in addition or as alternative, the first projection and the second projection are joined by a living hinge.

In another example, also a fenestration unit is provided that comprises a frame and a panel that is supported by the frame. Further, a weatherstrip system is provided that is removably attached to the frame. The weather strip system includes a weatherstrip carrier according to one of the preceding examples and a weatherstrip. The weatherstrip carrier is configured to retain the weatherstrip against the panel. The second projection removably received within the frame, with the weatherstrip carrier in the flexed position, and with the first and second projections cooperatively compressing against the frame to retain the weatherstrip carrier thereon.

In an example, also a method of manufacturing a weatherstrip carrier for a fenestration unit is provided that comprises the following steps: In one step, forming a weatherstrip support of the weatherstrip carrier is provided, the weatherstrip support being configured to hold a weatherstrip. In a further step, forming a coupling member that is attached to the weatherstrip support is provided. The coupling member is configured to removably attach to the fenestration unit, including forming the coupling member to include a spine, a first projection, and a second projection. The first and second projections are projecting from the spine in a common direction, and the coupling member is resiliently flexible for movement between a neutral position and a flexed position. The first and second projections are biased toward each other when the weatherstrip carrier is in the flexed position. The second projection is configured to be removably received within the fenestration unit, with the weatherstrip carrier in the flexed position, and with the first and second projections cooperatively compressing against the fenestration unit to retain the weatherstrip carrier thereon.

In an option of the method, forming the weatherstrip support and forming the coupling member includes integrally attaching the weatherstrip support and the coupling member.

In an additional or alternative option of the method, forming the weatherstrip support and forming the coupling member includes extruding the weatherstrip support and the coupling member in a single extrusion.

In another additional or alternative option, the method further comprises co-extruding the coupling member to include a first extruded portion and a second extruded portion of the coupling member. The first extruded portion has a higher flexibility than the second extruded portion.

In a further example, also a fenestration unit is provided that comprises a frame, a panel that is supported by the frame, and a weatherstrip system that is removably attached to the frame. The weather strip system includes a weatherstrip carrier and a weatherstrip. The weatherstrip carrier is configured to retain the weatherstrip against the panel. The weatherstrip carrier includes a spine, a first projection, and a second projection. The first and second projections are projecting from the spine in a common direction. Further, the weatherstrip carrier is resiliently flexible for movement between a neutral position and a flexed position, and the first and second projections are biased toward each other when the weatherstrip carrier is in the flexed position. Still further, the second projection is removably received within the frame, with the weatherstrip carrier in the flexed position, and with the first and second projections cooperatively compressing against the frame to retain the weatherstrip carrier thereon.

In an option, the panel is chosen from a group consisting of a sliding door active panel and a sliding door passive panel.

In an additional or alternative option of the method, the weatherstrip is removably attached to the weatherstrip carrier.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A slider fenestration unit comprising:

a frame with a sill that includes a base and an upstand that projects from the base, the sill including a channel partly defined by the base and the upstand, the upstand including an outward-facing face, an inward-facing face, and a lip surface that extends between the outward-facing and inward-facing faces;

a panel that is supported by the frame, the panel including a peripheral area that is received inside the channel with a panel face of the panel at the peripheral area facing the inward-facing face of the upstand with a gap defined therebetween; and a weatherstrip system that is removably attached to the upstand of the sill, the weatherstrip system including a weatherstrip carrier and a weatherstrip that is supported by the weatherstrip carrier;

the weatherstrip carrier including a spine, a first projection, and a second projection, the first and second projections projecting from the spine in a direction toward the panel face, the weatherstrip attached to the first projection;

the weatherstrip carrier being resiliently flexible for movement between a neutral position and a flexed position, the first and second projections being biased toward each other when the weatherstrip carrier is in the flexed position; and the second projection removably received within the outward-facing face of the upstand and the first projection biased against the lip surface with the weatherstrip carrier in the flexed position to clamp the weatherstrip carrier on the upstand, to dispose the weatherstrip over the gap, and to position the weatherstrip against the panel.

2. The slider fenestration unit of claim 1, wherein the slider fenestration unit is a sliding door unit; and wherein the panel is chosen from a group, the group consisting of:

a sliding door active panel that is supported for sliding movement along the sill within the frame; and a sliding door passive panel that is fixed within the frame.

3. The slider fenestration unit of claim 1, wherein the first and second projections extend along imaginary intersecting lines that are disposed at an acute angle relative to each other when the weatherstrip carrier is in the neutral position, wherein the weatherstrip carrier is resiliently flexible to vary the acute angle as the weatherstrip carrier resiliently flexes between the neutral position and the flexed position.

4. The slider fenestration unit of claim 3, wherein the first projection includes a substantially planar underside surface, and wherein the second projection includes a substantially planar opposing surface that opposes the underside surface, and wherein the acute angle is defined between the underside surface and the opposing surface.

5. The slider fenestration unit of claim 1, wherein the sill defines a longitudinal slider axis for the slider fenestration unit and the direction extends along a transverse axis that is normal to the longitudinal slider axis; and wherein the first projection includes an exterior surface that is sloped relative to a plane defined by the longitudinal slider axis and the transverse axis.

6. The slider fenestration unit of claim 1, wherein the second projection includes at least one barb that is resiliently flexible and that frictionally engages an interior surface of the upstand.

7. The slider fenestration unit of claim 1, wherein the weatherstrip is removably attached to the first projection of the weatherstrip carrier.

8. The slider fenestration unit of claim 7, wherein the first projection of the weatherstrip carrier includes an aperture that receives the weatherstrip.

9. The slider fenestration unit of claim 8, wherein the aperture is a groove that is configured to removably receive the weatherstrip.

10. The slider fenestration unit of claim 1, wherein the weatherstrip carrier is unitary and monolithic.

11. The slider fenestration unit of claim 10, wherein the weatherstrip carrier includes a first portion and a second portion that are integrally connected to be unitary and monolithic, the second portion having higher flexibility than the first portion, and the second portion being of a different material from the first portion.

12. The slider fenestration unit of claim 1, wherein the spine includes a first portion and a second portion that defines an edge, wherein the first projection extends from the first portion, wherein the second projection is spaced from the edge, the spine including a flange defined between the second projection and the edge.

13. The slider fenestration unit of claim 1, wherein the outward-facing face faces away from the panel face, wherein the spine at least partly covers the outward-facing face of the upstand, wherein the upstand projects from the base along a second direction, wherein the lip surface faces along the second direction, and wherein the first projection is configured to at least partly cover the lip surface of the upstand with the weatherstrip substantially sealed against the panel face.

14. The slider fenestration unit of claim 1, wherein the spine comprises a hinge that pivotally joins the first projection and the second projection.

15. A method of manufacturing a slider fenestration unit comprising:

providing a frame with a sill that includes a base and an upstand that projects from the base, the sill including a channel partly defined by the base and the upstand, the upstand including an outward-facing face, an inward-facing face, and a lip surface that extends between the outward-facing and inward-facing faces;

supporting a panel within the frame, the panel including a peripheral area that is received inside the channel with a panel face of the panel at the peripheral area facing the inward-facing face of the upstand with a gap defined therebetween; and removably attaching a weatherstrip system to the upstand of the sill, the weatherstrip system including a weatherstrip carrier and a weatherstrip that is supported by the weatherstrip carrier, the weatherstrip carrier including a spine, a first projection, and a second projection, the first and second projections projecting from the spine along a direction toward the panel face, the weatherstrip attached to the first projection, including:

resiliently flexing the weatherstrip carrier away from a neutral position and toward a flexed position, the first and second projections being biased toward each other when the weatherstrip carrier is in the flexed position;

removably receiving the second projection within the outward-facing face of the upstand; and biasing the first projection against the lip surface with the weatherstrip carrier in the flexed position to clamp the weatherstrip carrier on the upstand, to dispose the weatherstrip over the gap, and to position the weatherstrip against the panel.

16. The method of claim 15, further comprising forming the weatherstrip carrier, including:

forming a weatherstrip support and a coupling member of the weatherstrip carrier, the weatherstrip support configured to hold the weatherstrip, and the coupling member configured to removably attach to the upstand.

17. The method of claim 16, wherein forming the weatherstrip support and forming the coupling member includes extruding the weatherstrip support and the coupling member in a single extrusion.

18. The method of claim 17, further comprising co-extruding the coupling member to include a first extruded portion and a second extruded portion of the coupling member, the first extruded portion having higher flexibility than the second extruded portion.

* * * * *